No. 827,014. PATENTED JULY 24, 1906.
N. T. HANSON.
COOKER.
APPLICATION FILED MAY 9, 1905.
3 SHEETS—SHEET 1.
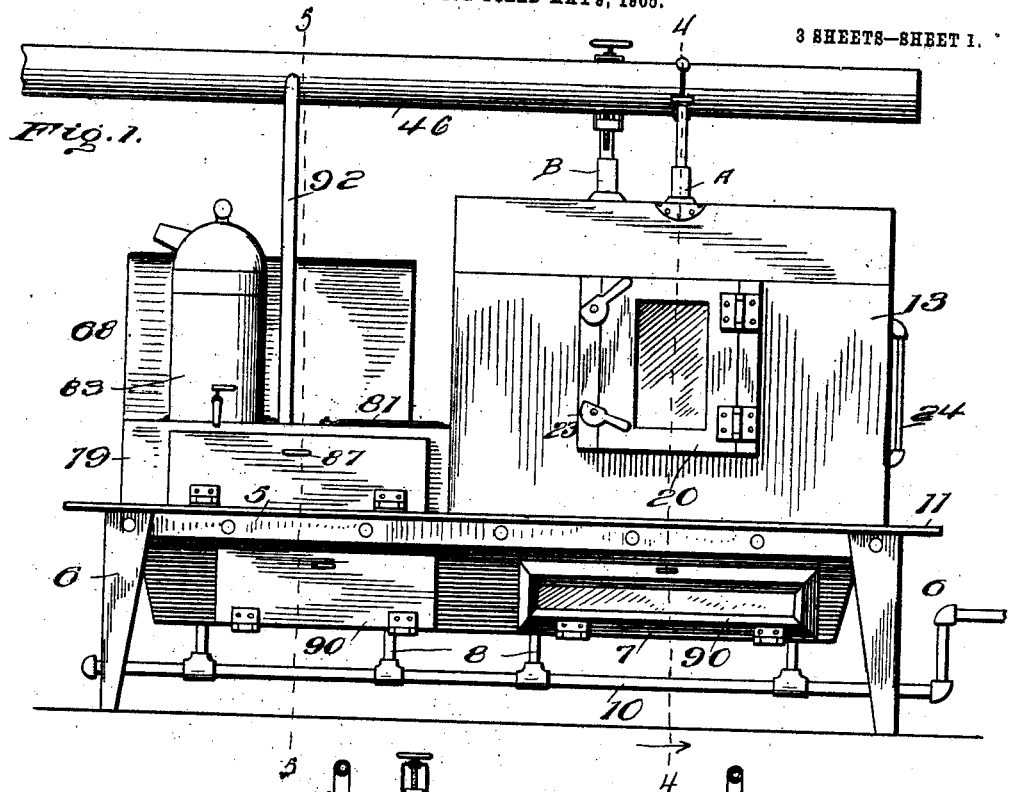
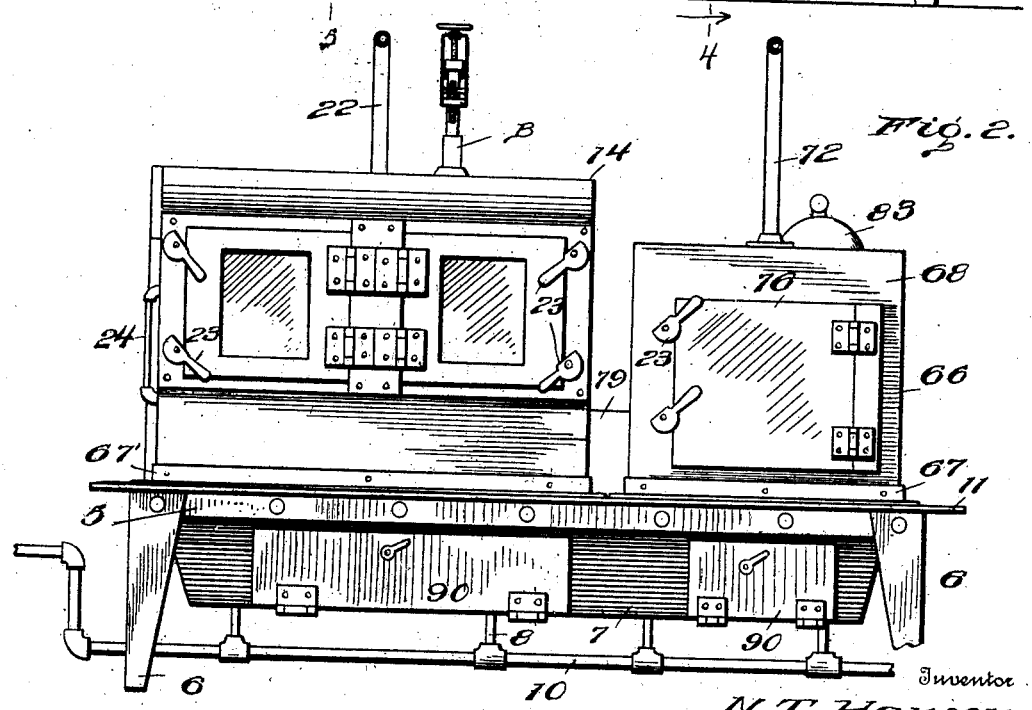
Witnesses
G. R. Thomas
E. M. Carford
Inventor
N. T. Hanson
By Chandlee & Chandlee
Attorneys No. 827,014. PATENTED JULY 24, 1906.
N. T. HANSON.
COOKER.
APPLICATION FILED MAY 9, 1905.

3 SHEETS—SHEET 2.

Witnesses
G. R. Thomas
E. M. Oxford

Inventor
N. T. Hanson
By Chandler & Chandler
Attorneys

No. 827,014. PATENTED JULY 24, 1906.
N. T. HANSON.
COOKER.
APPLICATION FILED MAY 9, 1905.
3 SHEETS—SHEET 3.
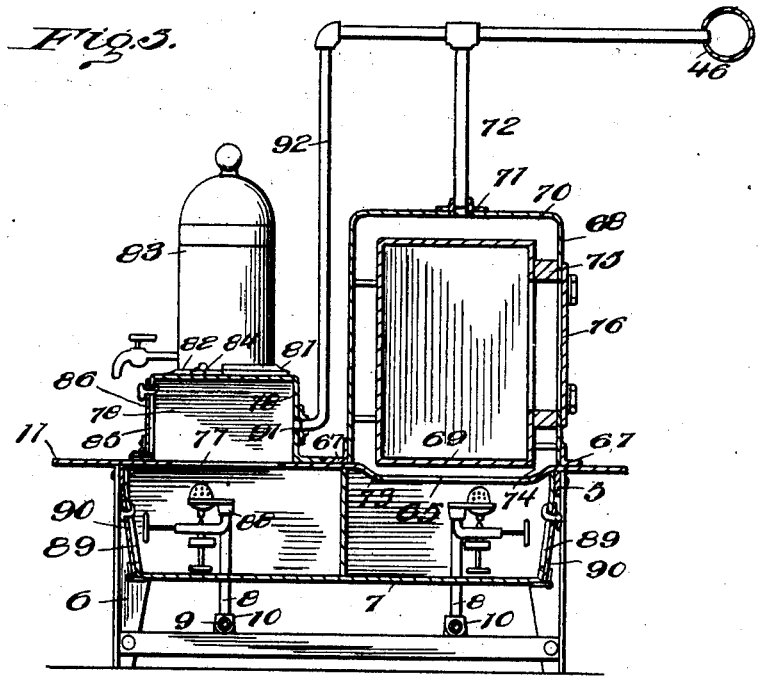
Witnesses
G. R. Thomas
E. M. Dolfrw.
Inventor
N. T. Hanson
By Chandler & Chandler
Attorneys

UNITED STATES PATENT OFFICE.

NELS T. HANSON, OF HAWARDEN, IOWA.

COOKER.

No. 827,014.  Specification of Letters Patent.  Patented July 24, 1906.

Application filed May 9, 1905. Serial No. 259,517.

*To all whom it may concern:*

Be it known that I, NELS T. HANSON, a citizen of the United States, residing at Hawarden, in the county of Sioux, State of Iowa, have invented certain new and useful Improvements in Cookers; and I do hereby declare the following to be a full, clear, and exact description of the invention, such as will enable others skilled in the art to which it appertains to make and use the same.

This invention relates to cookers, and has for its object to provide a cooker including a plurality of chambers, some of which will be equipped to cook matter by the steaming process, while others will be arranged for cooking by means of heated air.

Other objects and advantages will be apparent from the following description, and it will be understood that modifications of the specific construction shown may be made and any suitable materials may be used without departing from the spirit of the invention.

Figure 3:
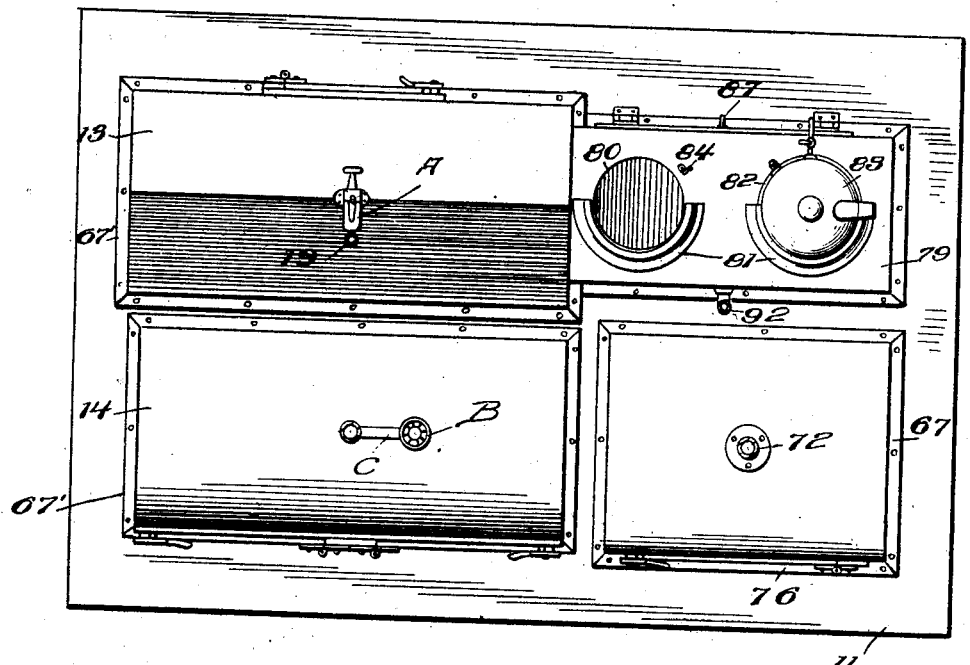
Figure 4:
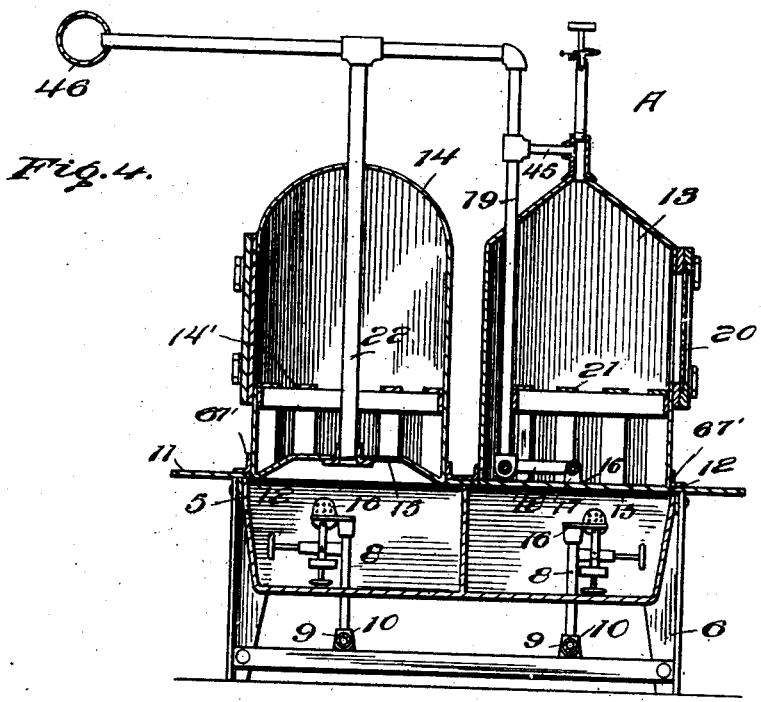

In the drawings forming a portion of this specification, and in which like characters of reference indicate similar parts in the several views, Figure 1 is a side elevation of the present invention. Fig. 2 is an elevation taken oppositely to Fig. 1. Fig. 3 is a top plan view. Fig. 4 is a section on line 4 4 of Fig. 1, taken transversely of the steam-chambers. Fig. 5 is a section on line 5 5 of Fig. 1, taken transversely of the oven and the stove-section. Fig. 6 is a detail view showing the stove-section in top plan and illustrating the means for holding the cooking utensils in position.

Referring now to the drawings, the present invention comprises a frame 5, provided with supporting-legs 6. Secured to the frame and depending therebelow there is a burner-casing 7, provided with openings in its bottom, in which are engaged fuel-supply pipes 8, which are connected with other fuel-pipes 9, which are mounted at their ends upon braces 10, extending transversely between the legs 6 at each end of the frame.

Mounted upon the frame there is a plate 11, having a pair of openings 12 adjacent to one of its ends, these openings being rectangular in shape and extending longitudinally of the plate, and secured to the plate above each of these openings there is a steaming-chamber, the chambers being indicated at 13 and 14. These chambers are provided with bottoms 15, and disposed to heat the bottom of the chambers are burners 16, which lie within the burner-casing 7. Formed through the bottom of the chamber 13 there is an opening 16', in which is fitted the end of a pipe 17, this pipe being connected with a coil of pipe 18, which at a point opposite to the pipe 17 is provided with an upwardly-extending discharge-pipe 19, which passes outwardly to the top of the chamber. The chamber is provided with a suitable door 20. The coil 18 lies below the door, and disposed within the chamber there is a grating 21 for the reception of matter to be cooked.

The chamber 14 is equipped similarly to the chamber 13, except that it is provided with two doors and a single pipe 22, opening through its top and bottom. The doors are provided with suitable fasteners 23 and are arranged to form steam-tight closures when they are in their operative positions.

In use water is placed in the chambers, and the burners therebeneath are lighted, the latter heating the water, thus generating sufficient steam to cook the matter disposed upon the grating, it being understood that the chamber 14 is provided with gratings 14', similar to the grating of the chamber 13. These chambers are provided with gage-glasses 24 to indicate the amount of water within the chambers. These chambers 13 and 14 are provided at their tops with safety-valves A and B, respectively, the safety-valve A being connected, by means of a pipe 45, with the pipe 19, which communicates with the pipe 22 and with a flue 46, the safety-valve B being connected with the pipe 22 to discharge thereinto by means of a pipe C.

Adjacent to the opposite end of the plate 11 from the steaming-chambers there is an opening 65, above which there is disposed an oven 66, the latter having an outwardly-extending flange 67 at its bottom, which is secured to the plate 11 at the edges of the opening 65. The steaming-chambers described above are secured to the plate 11 in a similar manner, these chambers being provided with flanges 67'.

The oven 66 consists of an outer casing 68 and an inner receptacle 69, the walls of the latter being spaced from those of the former to form a heat-chamber 70. At its top the outer casing is provided with an opening 71, to which a pipe 72 is connected which communicates with the flue 46. The plate 11 extends inwardly of the walls of the casing 68, and the portion lying inwardly of these walls and surrounding the opening 65 is struck down, as shown at 73, and the inner receptacle 69 lies with its bottom below the lower edges of the walls of the casing 68 and within the inclosure of this downwardly-struck portion, the bottom of the receptacle 69 lying in spaced relation to the downwardly-struck portion, as shown, to form passages 74, communicating with the chamber 70, as mentioned above. A burner is disposed within the burner-casing beneath the oven to heat the bottom of the receptacle 67, and the heat from this burner will also pass through the passages 74 and the chamber 70 to and through the pipe 72 to the flue 46, it being understood that the burner just mentioned is connected with one of the fuel-pipes described above. The oven is provided with a suitable opening formed through the casing 68, which alines with a similar opening formed through the inner receptacle. A filling-block 75 is disposed between the casing and receptacle and is provided with an opening alining with those of the casing and the receptacle. The openings are provided with a suitable closure 76.

Adjacent to the oven the plate 11 is provided with an opening 77, which communicates with the interior of a casing 78, secured above the opening by means of outwardly-extending flanges, which are secured to the plate. This casing forms a portion of a stove-section 79. In its top the casing is provided with openings 80 of circular shape, and at the rearward portions of these openings arc-shaped plates 81 are secured to the upper face of the casing and have their inner edges directed upwardly at an angle to receive the outwardly-extending base-flanges 82 of various cooking utensils therebeneath.

In the drawings a coffee-urn 83 is shown in position above one of the openings 80. To prevent displacement of the cooking utensil from the opening, latches 84 are pivoted to the upper face of the casing for movement into and out of position to extend above the base-flanges 82 and when in such position hold the utensils against displacement. In its forward face the casing 78 is provided with an opening 85, which has a suitable closure 86, provided with fastening means 87. Disposed within the burner-casing and extending upwardly within the casing 78 are suitable burners 88, one lying beneath each of the openings 80, and these burners are connected with the fuel-supply pipes described above.

The burner-casing is provided with a plurality of partitions which separate the burners of the different cooking-sections, and the burner-casing is provided with a plurality of openings 89, through which the burners may be reached, and these openings are provided with closures 90.

The stove-section 79 has a passage 91, formed through the rearward wall of its casing 78, and with this opening there is connected a pipe 92, which communicates with the flue 46.

What is claimed is—

1. An apparatus of the class described comprising cooking-chambers having openings therein, steam-tight closures for the openings, means for holding the closures in operative position, a burner-casing below the chambers, burners in the casing and arranged to heat the chambers, pipes communicating with the burner-casing and passing through the chambers for the conduction of products of combustion from the burner-casing, a flue communicating with the pipes, safety-valves for the chambers, and connections between the safety-valves and the flue for the passage of steam from the former to the latter.

2. In an apparatus of the class described, the combination with a legged frame, of a depending burner-casing secured to the frame, burners located within the burner-casing, chambers mounted upon the frame above the burners, discharge-pipes passed through the chambers and communicating with the burner-casing, safety-valves for the chambers communicating with the pipes, and a flue communicating with the pipes.

3. An apparatus of the class described comprising chambers arranged for the reception of food to be cooked, gage-glasses connected with the chambers, said chambers having openings therein for the reception of food within the chamber, steam-tight closures for the openings, a burner-casing disposed beneath the chambers, burners disposed within the burner-casing, discharge-pipes communicating with the burner-casing and passed through the chambers, a flue, said discharge-pipes communicating with the flue, and safety-valves for the chambers, said safety-valves being arranged to discharge into the flue.

4. In an apparatus of the class described, the combination with a frame, of a depending burner-casing carried by the frame, burners located within the burner-casing, a stove-section mounted upon the frame to receive heat from one of the burners and including a casing having flanges resting upon the frame and secured thereto, said casings being arranged for the reception of cooking utensils thereupon, an oven mounted upon the frame adjacent to the stove-section and above another burner, a pipe communicating with the the casing of the stove-section at its side adjacent to the oven and extending upwardly therefrom, said oven comprising an inner receptacle and an outer heat-chamber, a pipe communicating with said heat-chamber and with said first-named pipe, and a flue communicating with said first-named pipe.

In testimony whereof I affix my signature in presence of two witnesses.

NELS T. HANSON.

Witnesses:
D. T. GEARHART,
JAMES BARCLAY.